United States Patent [19]
Volk

[11] Patent Number: 5,735,736
[45] Date of Patent: Apr. 7, 1998

[54] RETAINER FOR POULTRY HOCKS

[75] Inventor: Daniel J. Volk, Alpharetta, Ga.

[73] Assignee: Volk Enterprises, Inc., Turlock, Calif.

[21] Appl. No.: 750,415

[22] PCT Filed: May 25, 1995

[86] PCT No.: PCT/US95/06770

§ 371 Date: Dec. 6, 1996

§ 102(e) Date: Dec. 6, 1996

[87] PCT Pub. No.: WO95/33382

PCT Pub. Date: Dec. 14, 1995

Related U.S. Application Data

[63] Continuation-in-part of Ser. No. 254,247, Jun. 6, 1994, Pat. No. 5,498,201.

[51] Int. Cl.⁶ ............................................. A22C 21/00
[52] U.S. Cl. ........................................ 452/176; 452/174
[58] Field of Search ........................................ 452/174, 176

[56] References Cited

U.S. PATENT DOCUMENTS

| | | |
|---|---|---|
| 1,123,019 | 12/1914 | Selden . |
| 2,189,421 | 2/1940 | Huschka ............................ 452/176 |
| 3,348,595 | 10/1967 | Stevens, Jr. . |
| 3,357,070 | 12/1967 | Sloan . |
| 3,895,415 | 7/1975 | Volk ................................. 452/174 |
| 4,056,865 | 11/1977 | Cloyd ............................... 452/176 |
| 4,818,121 | 4/1989 | Volk . |
| 5,102,370 | 4/1992 | Volk . |
| 5,112,274 | 5/1992 | Volk . |
| 5,181,880 | 1/1993 | Volk . |
| 5,279,519 | 1/1994 | Volk . |
| 5,380,241 | 1/1995 | Volk ................................. 452/174 |

FOREIGN PATENT DOCUMENTS

| | | | |
|---|---|---|---|
| 205672 | 12/1986 | European Pat. Off. ............ 383/71 |
| 1353431 | 1/1964 | France .......................... 383/71 |
| 1218932 | 6/1966 | Germany ....................... 383/71 |

*Primary Examiner*—Willis Little
*Attorney, Agent, or Firm*—Flehr Hohbach Test Albritton & Herbert LLP

[57] ABSTRACT

A retainer for use with a body of eviscerated fowl having first and second legs with respective hocks. The retainer includes a unitary substantially planar thin plastic member which mounts about the hocks. The thin plastic member has an outer portion defining an opening which is elongated and of sufficient size to receive the legs. A plurality of protuberances integral with the outer portion extend inwardly into the opening for engaging the legs so as to hold the legs in a position extending perpendicular to the thin plastic member substantially parallel to each other when the thin plastic member is mounted about the hocks.

19 Claims, 2 Drawing Sheets

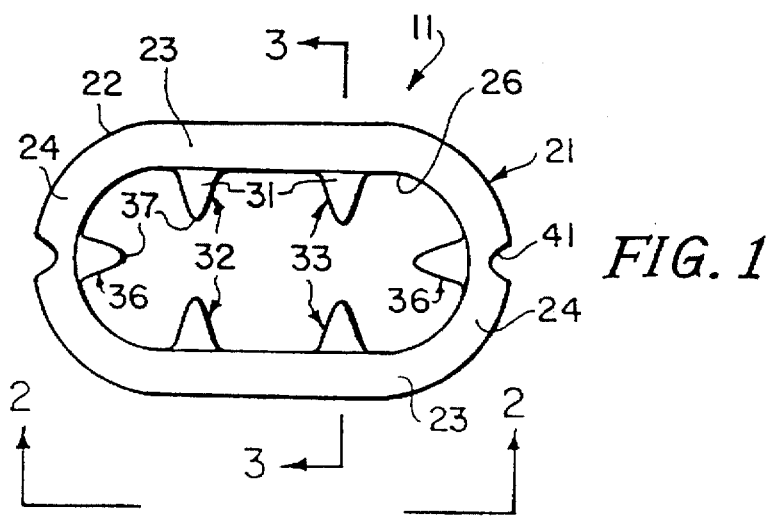
FIG. 1
FIG. 2
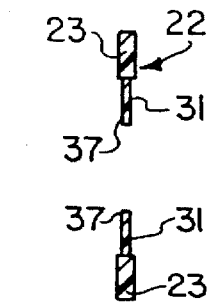
FIG. 3
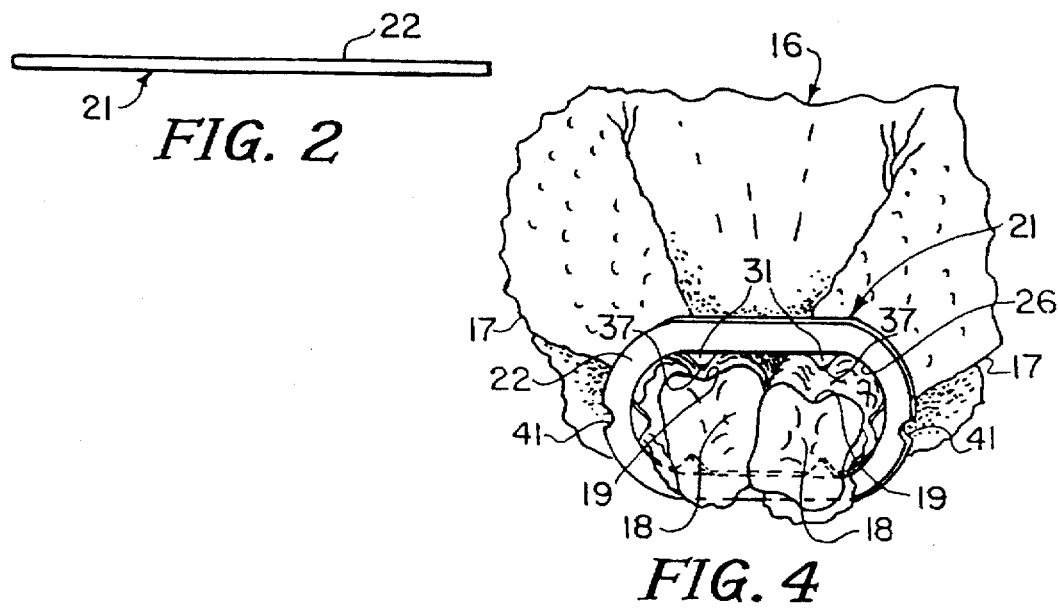
FIG. 4
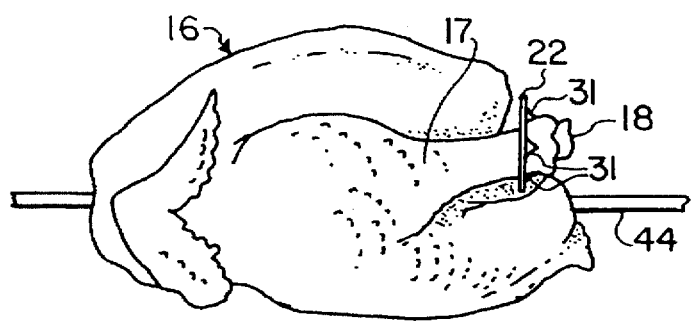
FIG. 5

RETAINER FOR POULTRY HOCKS

This application claims the priority of International Application No. PCT/US95/06770 filed May 25, 1995, which is a continuation-in-part application of U.S. patent application Ser. No. 08/254,247 filed Jun. 6, 1994, now U.S. Pat. No. 5,498,201.

This invention relates in general to a retainer or truss for poultry or fowl and pertains, more specifically, to a retainer for securing hocks of small fowl during processing, shipping and cooking.

Whole bodies of eviscerated poultry such as chicken are currently packed and shipped for retail to the consumer. In some instances, the eviscerated chicken are flavorized prior to shipping and cooked by the retailer prior to sale. Cooking of the chickens is often accomplished by skewering the chickens and mounting them on a rotisserie for baking in an oven. Since chicken legs tend to loosen during cooking, it is usually the practice to secure the legs to the body during cooking. In one common method of securement, the skin is slit and the leg tucked beneath the skin. This method of securing chicken legs during cooking suffers from a number of disadvantages, including possible contamination of the chicken and difficulties in cooking if the leg comes out of the slit due to improper formation of the slit.

Accordingly, a primary object of the present invention is to provide a retainer for use with a body of eviscerated poultry to secure the hocks of the fowl close to the body during shipping and cooking.

Another object of the invention is to provide a retainer of the above character which is suitable for use with small poultry such as chicken.

Another object of the invention is to provide a retainer of the above character which can be easily attached to the chicken body.

Another object of the invention is to provide a retainer of the above character which is suitable for an automated installation process.

Another object of the invention is to provide a retainer of the above character which can be utilized to indicate characteristics of the chicken such as flavor.

In general, the invention consists of a retainer for use with a body of eviscerated fowl having first and second legs with respective hocks. The retainer includes a unitary substantially planar thin plastic member which mounts about the hocks. The thin plastic member has an outer portion defining an opening which is elongated and of sufficient size to receive the legs. A plurality of protuberances integral with the outer portion extend inwardly into the opening for engaging the legs so as to hold the legs in a position extending perpendicular to the thin plastic member substantially parallel to each other when the thin plastic member is mounted about the hocks.

The accompanying drawings, which are incorporated in and form a part of this specification, illustrate several embodiments of the invention and, together with the description, serve to explain the principles of the invention.

FIG. 1 is top plan view of the retainer of the present invention.

FIG. 2 is a side elevational view of the retainer of FIG. 1 taken along the line 2—2 of FIG. 1.

FIG. 3 is a cross-sectional view of the retainer of FIG. 1 taken along the line 3—3 of FIG. 1.

FIG. 4 is an enlarged view of a chicken with the retainer of FIG. 1 in position thereon.

FIG. 5 is a side elevational view of the chicken of FIG. 4 skewered for mounting in a rotisserie.

Figure 6:
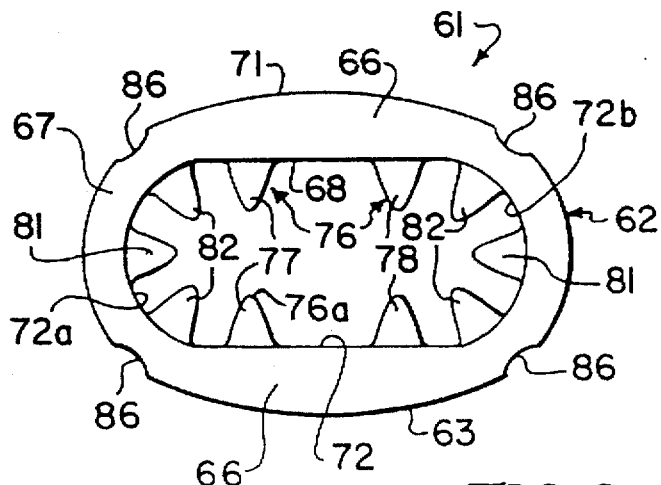
FIG. 6 is top plan view of another embodiment of the retainer of the present invention.

Reference will now be made in detail to the preferred embodiments of the invention, examples of which are illustrated in the accompanying drawings. While the invention will be described in conjunction with the preferred embodiments, it will be understood that the invention is not limited to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is first directed to FIGS. 1 through 5 where one embodiment of the invention is illustrated.

Poultry leg truss or retainer 11 of the present invention is for use with a carcass or body 16 of eviscerated poultry such as a chicken having drumsticks or legs 17 with exposed knuckles or hocks 18 (see FIGS. 4 and 5). Each of the hocks is formed with a groove 19 which extends from one side of the hock around the end to the other side of the hock. Retainer 11 is made from a unitary thin substantially coplanar member 21 made from any suitable material such as plastic and preferably injection molded out of nylon. Longitudinally extending thin member 21 includes an outer or ring-like peripheral portion in the form of oblong-shaped ring 22 having a band width of approximately 0.23 inch and a band thickness of approximately 0.05 inch. Ring 22 is relatively rigid and is formed from parallel first and second elongate portions 23 joined at respective ends by semicircular-shaped first and second end portions 24. Oblong ring 22 defines a central opening 26 which is of a sufficient size to permit hocks 18 of chicken body 16 to pass therethrough. More specifically, elongate portions 23 are spaced apart a distance of approximately one inch and end portions 24 have an inner radius of approximately 0.5 inch so that central opening 26 has a length of approximately 2.2 inches at its widest point across the longitudinal center of thin member 21. Although oblong ring 22 is shown as being closed, it should be appreciated that the ring could be open and/or made from metal or wire and be within the scope of the present invention.

A plurality of prong portions or prongs 31 extend inwardly from oblong ring 22. Prongs 31 are spaced around the inside of the oblong ring so as to be aligned in opposed pairs, although a retainer 11 having prongs not aligned in opposed pairs would be within the scope of the present invention. First and second opposed pairs 32 and 33 are in general parallel alignment and extend inwardly from elongate portions 23 adjacent the ends of the elongate portions. Opposed pairs 32 and 33 have a center-to-center spacing of approximately 0.8 inch. Third opposed pair 36 is disposed at a right angle to first and second opposed pairs 32 and 33 and extends inwardly from the center of end portions 24 along the longitudinal centerline of thin member 22. Each of prongs 31 tapers toward an end portion 37 as it extends inwardly from oblong ring 22 and, as such, is generally triangular in shape. The prongs each extend inwardly from the oblong ring a distance of approximately 0.25 inch and have a thickness of approximately 0.03 inch so as to be relatively flexible in comparison to oblong ring 22.

Retainer 11 further includes a semicircular groove 41 formed on the outside of each end portion 24 of oblong ring 22. Grooves 41 are generally centered on the longitudinal centerline of thin member 22.

In operation and use, retainer 21 is adapted for mounting about hocks 18 of chicken body 16 for retaining the hocks together in juxtaposition during shipping, storage and cooking. As discussed above, central opening 26 of oblong ring 22 is sized so that hocks 18 can fit therethrough. The hocks can be placed sequentially through the central opening or, in the alternative, the hocks can be pushed through the central opening together after being placed in a side by side position. Prongs 31 are longitudinally sized so that they engage hocks 18 during placement of retainer 21 on body 16 and are sufficiently flexible so as to bend away from the advancing hocks and permit the hocks to pass through central opening 26. The reduced thickness of the prongs in comparison to the oblong ring, as shown in FIG. 3, permits this flexibility.

The relative alignment of prongs 31 facilitates placement of retainer 11 on chicken body 16 and the securement of the retainer to chicken legs 17. The longitudinal spacing between first and second opposed pairs 32 and 33 is such that prong end portions 37 are in general alignment with grooves 19 of the hocks as retainer 11 is pushed thereover. Once the flexible prongs have advanced over the hocks, they bend back toward their planar or home position until end portions 24 engage legs 17 adjacent or behind hocks 18. When in this retaining position, prongs 31 are bent outwardly toward the hocks so that end portions 37 engage the rear of the hocks and serve to retain thin member 22 in its mounted position about legs 17 (see FIG. 5). The prongs of first and second opposed pairs 32 and 33 are substantially centered on legs 17 of chicken body 16 and exert generally counter-balancing forces against opposite sides of the legs (see FIG. 4). The prongs of third opposed pair 36 are substantially centered on opposite sides of legs 17 and serve to urge the legs toward each other so that hocks 18 are in juxtaposition.

Chicken body 16 with hocks 18 trussed by retainer 11 can be packaged and shipped to a retailer. As will be appreciated by those skilled in the art, packaging is made easier because of the relative uniformity amongst the trussed chicken bodies. The retailer can sell the chickens uncooked or mount them to a rotisserie bar 44, as illustrated in FIG. 5, for cooking prior to sale. Retainer 11 holds legs 17 in place against chicken body 16 during cooking. In addition, the cooking of the chicken body is enhanced by the trussing of the legs.

Retainer 11 is particularly suited for storage and shipping and grooves 41 can be utilized to facilitate stacking and storage of the retainers in general alignment with each other. Retainer 11 can also be installed on the chicken in an automated process and grooves 41 may be utilized for gripping and aligning the retainer in this regard. In addition, retainer 21 can serve as a label stating certain information regarding the chicken to which it is attached. For example, the retainer can be imprinted and/or colored to indicate characteristics such as flavoring of the chicken.

Although certain measurements have been included for retainer 11, it should be appreciated that the retainer can be made to fit chickens of varying sizes. In addition, the retainer can also be sized to fit other poultry such as turkey and be within the scope of the present invention.

It should be appreciated that other poultry retainers for use with a body of eviscerated fowl having first and second legs 17 with severed extremities or hocks 18 can be provided and be within the scope of the present invention. For example, a poultry leg retainer 61 substantially similar to retainer 11 is illustrated in FIG. 6 and includes a unitary substantially planar thin plastic member 62 which mounts about the hocks 18 of legs 17. Thin member 62 is injection molded out of nylon or made from any other suitable material and includes an elongate or oblong outer portion or ring 63 having spaced-apart first and second elongate portions 66 extending in directions generally parallel to each other and arcuately-extending first and second end portions 67 which serve to join the respective ends of elongate portions 66. Elongate portions 66 have generally straight inner surfaces 68 and opposite convex outer surfaces 71 which arc slightly outwardly at the center thereof. End portions 67 have a substantially constant width of approximately 0.25 inch and elongate portions 66 have a width at their widest or central point of approximately 0.3 inch. Portions 66 and 67 each have a thickness of approximately 0.06 inch.

Thin member 62 has a central opening 72 defined by ring 63. Central opening 62 is elongated and has a ratio of length to width of at least two to one. More specifically, opening 2 has a length of approximately 2.2 inches at its widest point from the inside centers of generally semicircular end portions 67 and a width of approximately one inch between opposite inner surfaces 68 of elongate portions 66. Central opening 72 has a first or left portion 72a formed in part by one of end portions 67 and a second or right portion 72b at the opposite end of the elongate opening from left portion 72a formed in part by the other end portion 67.

Retainer 61 is provided with a plurality of spaced-apart protuberances or prong portions 76 formed integral with ring 63 and extending inwardly into central opening 62 at approximately right angles from the ring. Each of the prong portions or prongs 76 has a thickness of approximately 0.015 inch which is less than the thickness of outer ring 63. Each prong 76 has the general shape of an isosceles triangle and has first and second sides which taper inwardly at a relative angle of approximately 45° toward a rounded inner end portion or extremity 76a. It should be appreciated, however, that prong portions 76 can have other shapes and be within the scope of the present invention. For example, the prong portions could be more rounded and/or be more semicircular in shape.

As illustrated in FIG. 6, retainer 61 is formed with ten prongs 76. A first opposed pair of prongs 77 are formed at the ends of elongate portions 66 at the left portion 72a of central opening 72 and are generally centered on an imaginary line extending at ring angles to the elongate portions. A second opposed pair of prongs 78 is formed at the opposite end of the elongate portions 66 and are centered on a second imaginary line extending at right angles to the elongate portions. As such, first and second opposed pairs 77 and 78 of prongs 76 extend in directions generally parallel to each other. A third opposed pair 81 of prongs is provided in retainer 61. The prongs of the third opposed pair 81 are formed at the respective centers of end portions 67 and, as so disposed, are aligned at right angles to first and second opposed pairs 77 and 78. Each of the end portions 67 further includes two additional prongs 82 which extend radially inwardly from the end portions at right angles to each other. Each prong 82 is equidistantly spaced between one of the prongs 76 of a third opposed pair 81 and one of the prongs 76 of a first or second opposed pair 77 or 78. Retainer 61 as so constructed has at least three and more specifically five prongs 76 spaced apart at approximately equal intervals extending into each of portions 72a and 72b of central opening 72, each of these sets of prongs 76 being spaced apart over the full 180° of the respective end portion.

Retainer 61 further includes at least one and as shown in the drawings two semicircular grooves 86 formed on the outside of each end portion 67. Each groove 86 is aligned at an angle of approximately 45° from the longitudinal centerline of the retainer.

The operation and use of retainer 61 is substantially similar to that described above for retainer 11. In this regard, hocks 18 of the eviscerated fowl such as chicken body 16 are pushed against prongs 76 through central opening 72. The prongs 76 are sufficiently flexible so as to bend and permit the hocks to pass through the central opening. The reduced thickness of prongs 76 relative to prongs 31 of retainer 11 facilitate mounting of retainer 61 to eviscerated body 16. In addition, the increased thickness of ring 63 relative to ring 22 of retainer 11 adds to the rigidity of thin member 62 so as to further facilitate placement of the retainer 61 on legs 17. The widened central portion of elongate portions 66 increases the ease in which retainer 61 can be gripped during the mounting process. Grooves 86 permit automated mounting of the retainer 61 and the offset arrangement of these grooves in comparison to grooves 41 of retainer 11 has been found to reduce the amount of undesirable bending of the retainer during automated placement thereof.

The elongated central opening 72 of retainer 61 is sufficiently sized to receive legs 17. More in particular, each of spaced-apart left and right portions 72a and 72b of the central opening is sized so as to receive a leg 17 with the plurality of prongs 76 in left portion 72a engaging one leg 17 and the plurality of prongs 76 in right portion 72b engaging the other leg 17. Rounded end portions 76a of each of the prongs 76 engage legs 17 behind hocks 18 in the same manner as the prongs 31 of retainer 11 so that the legs extend generally perpendicularly from thin member 62 (see FIG. 5). Additional prongs 82, as so disposed at approximately 45° relative to adjacent prongs, facilitate the securing of retainer 61 to legs 17 and the retention of the legs in the desired position for cooking. In this regard, the additional prongs 82 preclude legs 17 from moving outwardly toward ring 63 between the adjacent prongs 76 and thus loosening the grip of the retainer 61 on the fowl.

When retainer 61 is so mounted to the eviscerated chicken body 16, legs 17 are held in close proximity to the body and, as illustrated in FIG. 4 with respect to retainer 11, substantially parallel to each other. The poultry product including body 16 so dressed with retainer 61 can be baked in the same manner as discussed above with respect to retainer 11. Retainer 61 can also be color coded or otherwise imprinted with information in the same manner as retainer 11. Although retainer 61 has been described with respect to fowl such as chickens, it should be appreciated that the retainer could be sized for use with turkeys and be within the scope of the present invention.

Figure 7:
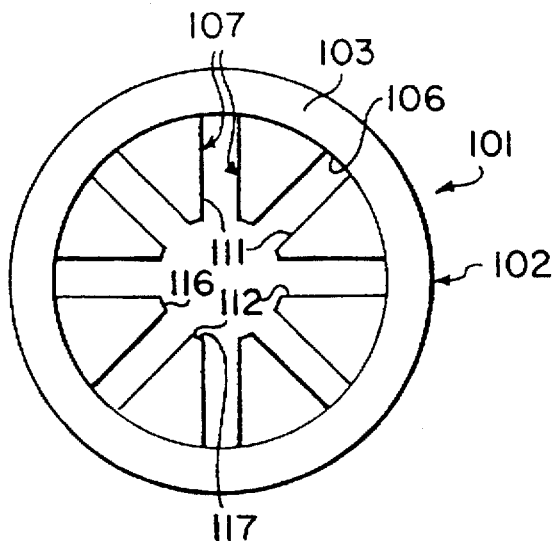
FIG. 7 is top plan view of another embodiment of the retainer of the present invention.
Figure 8:
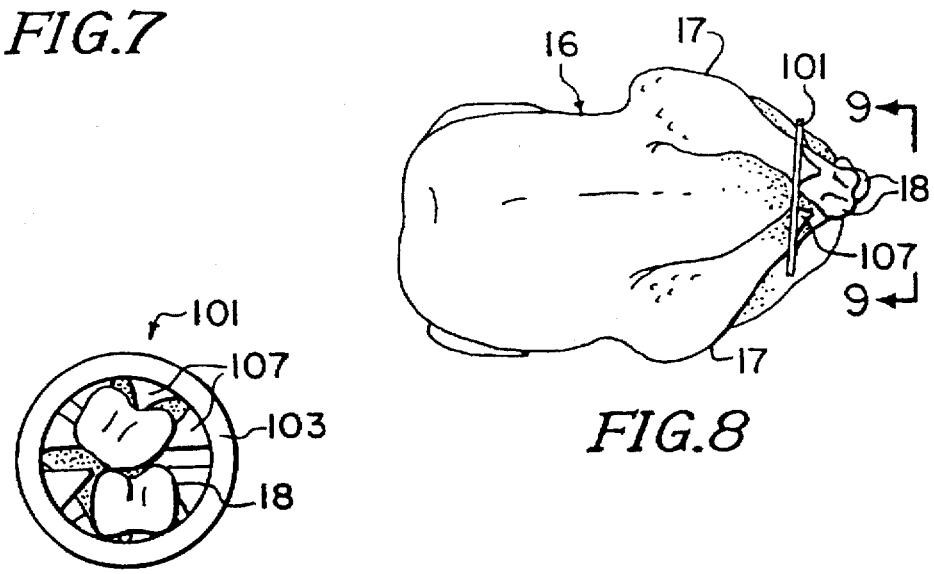
FIG. 8 is a top plan view of a chicken with the retainer of FIG. 7 in position thereon.
Figure 9:
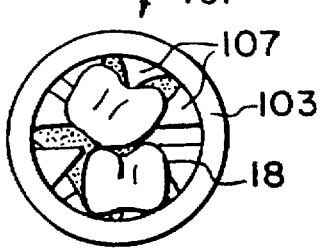
FIG. 9 is a rear elevational view taken along the line 9—9 of FIG. 8 of the retainer of FIG. 7.

Yet a further embodiment of the poultry truss of the present invention is illustrated in FIG. 7–9 where a retainer 101 is shown. Retainer 101 is made from a unitary substantially planar thin plastic member 102 made from any suitable material such as nylon. Thin member 102 is formed with an outer or ring-like peripheral portion in the form of outer circular ring 103 having an outer diameter ranging from approximately 2 inches when constructed for chickens to approximately 3.5 inches when constructed for turkeys and an inner diameter correspondingly sized from approximately 1.5 to 3.0 inches. Substantially rigid ring 103 has a width of approximately 0.25 inch and a thickness ranging from 0.06 to 0.09 inch.

Ring 103 defines a central opening 106 in thin member 102 and includes a plurality of protuberances or prong portions in the form of prongs 107 which extend radially inwardly into central opening 106 at approximately right angles to the ring 103. Prongs 107 are spaced apart around the inside of ring 103 at approximately equal 45° angular intervals with adjacent prongs 107 being spaced apart a distance ranging from approximately 0.06 to 0.5 inch. Prongs 107 can be grouped into first prongs 111 disposed at approximately 90° intervals around the inside of ring 103 and second prongs 112 also disposed at approximately 90° intervals around the inside of ring 103 with a second prong 112 disposed between each adjacent pair of first prongs 111. As can be seen from FIG. 7, prongs 107 can also be grouped into four sets of opposed pairs of prongs.

Each prong 107 is generally in the shape of an isosceles triangle and tapers as it extends into opening 106 a distance ranging from approximately 0.25 to 0.375 inch to its respective end portion 116. A concave arcuately-extending surface 117 is provided on each end portion 116 and, together, these arcuate surfaces 117 form an imaginary inner circle having a diameter ranging from 0.375 to 1.5 inch. Each of the prongs 107 is relatively flexible in comparison to substantially rigid ring 103 and, in this regard, has a thickness of approximately 0.03 inch.

In operation and use, retainer 101 is mounted about hocks 18 of eviscerated body 16 so as to hold legs 17 in close proximity to the body 16 (see FIG. 8). For securing the retainer 101 to legs 17, hocks 18 of the legs 17 are placed together and pushed through central opening 106 past bendable prongs 107. The internal dimensions of central opening 106 are sufficient to permit hocks 118 to pass therethrough and to receive legs 17 therein. Once circular ring 103 has been pushed past hocks 18, prongs 107 bend outwardly so that arcuate surfaces 117 thereof engage legs 17 behind the hocks. Retainer 101 is then rotated about legs 17 causing the legs to crisscross as illustrated in FIG. 8. Retainer 101 serves to secure hocks 18 together as illustrated in FIG. 9 and to hold the legs in close proximity to the eviscerated body 16.

The chicken or turkey so trussed by retainer 101 can be cooked as described above. The retainer 101 can include information via color coding or otherwise about the flavoring or other characteristics of the poultry body to which it is mounted.

It is apparent from the foregoing that a retainer for use with a body of an eviscerated fowl has been provided to secure the hocks of the fowl close to the body during shipping and cooking. The retainer is suitable for use with small poultry such as chicken and can be easily attached to the chicken body. The retainer is suitable for an automated installation process and can also be used to indicate characteristics of the chicken such as flavor.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the claims appended hereto and their equivalents.

What is claimed is:

1. A retainer for use with a body of eviscerated fowl having first and second legs with respective hocks, comprising a unitary substantially planar thin plastic member which mounts about the hocks, the thin plastic member having an outer portion defining an opening which is elongated and of sufficient size to receive the legs and a plurality of protuberances integral with the outer portion extending inwardly into the opening for engaging the legs so as to hold the legs in a position extending substantially perpendicular to the thin plastic member and parallel to each other when the thin plastic member is mounted about the hocks.

2. A retainer as in claim 1 wherein the protuberances have rounded portions which engage the legs adjacent the hocks.

3. A retainer as in claim 1 wherein the thin plastic member has opposite arcuately-extending end portions for forming at least a portion of the opening.

4. A retainer as in claim 3 wherein the thin plastic member has spaced-apart elongate portions extending between the arcuately-extending end portions.

5. A retainer as in claim 1 wherein the outer portion defines an opening having spaced-apart first and second portions which are each of sufficient size to receive a leg, a plurality of protuberances extending inwardly from the outer portion into each portion of the opening for engaging the respective leg adjacent the hock.

6. A retainer as in claim 5 wherein the plurality of protuberances includes at least three spaced-apart protuberances extending inwardly from the outer portion into each portion of the opening.

7. A retainer as in claim 6 wherein the plurality of protuberances includes five spaced-apart protuberances extending inwardly into each portion of the opening.

8. A retainer for use with a body of eviscerated fowl having first and second legs with respective severed extremities, comprising a unitary substantially planar thin plastic member which mounts about the severed extremities, the thin plastic member having an outer portion defining an elongate opening sized to receive the legs and having a length and a width, the ratio of the length to the width being at least two to one, and a plurality of protuberances integral with the outer portion extending inwardly into the opening for engaging each of the legs so as to hold the legs in a position extending substantially perpendicular to the thin plastic member and parallel to each other when the thin plastic member is mounted about the severed extremities.

9. A retainer as in claim 8 wherein the plurality of protuberances includes a first opposed pair of protuberances for engaging the first leg and a second opposed pair of protuberances spaced apart from the first opposed pair of protuberances for engaging the second leg.

10. A retainer as in claim 9 wherein the first opposed pair of protuberances is generally parallel to the second opposed pair of protuberances and wherein the plurality of protuberances further includes a third opposed pair of protuberances aligned at right angles to the first and second opposed pairs of protuberances.

11. A retainer as in claim 10 wherein the plurality of protuberances further includes a plurality of additional protuberances extending at approximately 45° angles to the first, second and third opposed pairs of protuberances.

12. A poultry product ready for baking comprising an eviscerated fowl having first and second legs with respective hocks, a unitary substantially planar thin plastic member for mounting about the hocks, the thin plastic member having an outer portion defining an opening of sufficient size to receive the legs, the plurality of protuberances extending inwardly into the opening from the outer portion for engaging the legs so as to hold the legs in close proximity to the fowl when the thin plastic member is mounted about the hocks.

13. A poultry product as in claim 12 wherein the outer portion is elongate in shape.

14. A poultry product as in claim 12 wherein the outer portion is a circular ring.

15. A poultry product as in claim 14 wherein the plurality of protuberances are spaced apart at approximately 90° intervals around the circular ring.

16. A poultry product as in claim 14 wherein the plurality of protuberances are spaced apart at approximately 45° intervals around the circular ring.

17. A poultry product as in claim 12 wherein the outer portion has a thickness and the protuberances have thicknesses less than the thickness of the outer portion.

18. A poultry product as in claim 17 wherein the protuberances are spaced apart around the outer portion so as to be aligned in opposed pairs.

19. A poultry product as in claim 12 wherein the plurality of protuberances extend inwardly into the opening at right angles to the outer portion.

* * * * *